United States Patent
Okino

(10) Patent No.: US 8,331,867 B2
(45) Date of Patent: *Dec. 11, 2012

(54) WIRELESS COMMUNICATION SYSTEM, WIRELESS COMMUNICATION APPARATUS AND COMMUNICATION CONTROL METHOD

(75) Inventor: Kenta Okino, Yokohama (JP)

(73) Assignee: Kyocera Corporation, Kyoto (JP)

( * ) Notice: Subject to any disclaimer, the term of this patent is extended or adjusted under 35 U.S.C. 154(b) by 105 days.

This patent is subject to a terminal disclaimer.

(21) Appl. No.: 12/865,718

(22) PCT Filed: Jan. 22, 2009

(86) PCT No.: PCT/JP2009/050997
§ 371 (c)(1), (2), (4) Date: Jul. 30, 2010

(87) PCT Pub. No.: WO2009/096317
PCT Pub. Date: Aug. 6, 2009

(65) Prior Publication Data
US 2010/0330923 A1    Dec. 30, 2010

(30) Foreign Application Priority Data

Jan. 30, 2008  (JP) ................................ 2008-019538
Jan. 30, 2008  (JP) ................................ 2008-019551

(51) Int. Cl.
*H04B 17/00* (2006.01)
(52) U.S. Cl. .................... 455/67.11; 455/67.16; 455/10; 455/115.1; 375/267
(58) Field of Classification Search .............. 455/67.11, 455/67.16, 10, 115.1, 226.1, 504, 67.13; 375/267, 347; 370/252, 280
See application file for complete search history.

(56) References Cited

U.S. PATENT DOCUMENTS

| | | | |
|---|---|---|---|
| 7,623,587 B2* | 11/2009 | Shim et al. ..................... | 375/267 |
| 2005/0047517 A1* | 3/2005 | Georgios et al. .............. | 375/267 |
| 2005/0157807 A1* | 7/2005 | Shim et al. ..................... | 375/267 |
| 2009/0093265 A1* | 4/2009 | Kimura et al. ................ | 455/500 |

(Continued)

FOREIGN PATENT DOCUMENTS

JP    2002-314483    10/2002

(Continued)

OTHER PUBLICATIONS

International Search Report for PCT/JP2009/050997, mailed on Apr. 21, 2009, 2 pages.

(Continued)

*Primary Examiner* — Minh D Dao
(74) *Attorney, Agent, or Firm* — Duane Morris LLP

(57) ABSTRACT

A channel estimation and prediction unit 18 estimates a channel and predicts a channel for a next transmission slot. An SVD unit 19 performs singular value decomposition on each channel prediction value. An eigenvalue calculation unit 20 calculates an eigenvalue in a slot, whereas an eigenmode quality calculation unit 21 calculates quality of each eigenmode based on the eigenvalue obtained from the eigenvalue calculation unit 20 and outputs the quality to a transmission adaptive control unit 22. The transmission adaptive control unit 22 recognizes frequency of channel variation based on variation of quality of a lower eigenmode and the likes, and corrects quality of a higher eigenmode to be a smaller value according to the frequency of channel variation being larger with respect to a slot length.

16 Claims, 8 Drawing Sheets

U.S. PATENT DOCUMENTS

| | | | | |
|---|---|---|---|---|
| 2009/0310701 A1* | 12/2009 | Shim et al. | ............... | 375/267 |
| 2010/0150013 A1* | 6/2010 | Hara et al. | ............... | 370/252 |
| 2010/0330923 A1* | 12/2010 | Okino | ............... | 455/67.11 |
| 2011/0158361 A1* | 6/2011 | Dent et al. | ............... | 375/347 |

FOREIGN PATENT DOCUMENTS

| | | |
|---|---|---|
| JP | 2005-252834 | 9/2005 |
| JP | 2007-049531 | 2/2007 |
| JP | 2007-116414 | 5/2007 |

OTHER PUBLICATIONS

Mizutani et al., The Institute of Electronics, Information and Communication Engineers Society Taikai Koen Ronbunshu (2005) p. 247.

Tsutsumi et al., Proceedings of the IEICE General Conference, Mar. 3, 2003, p. 776.

Korean Office Action for Korean Patent Application No. 10-2010-7017213, issued Jul. 29, 2011, 5 pages (including English translation).

* cited by examiner

WIRELESS COMMUNICATION SYSTEM, WIRELESS COMMUNICATION APPARATUS AND COMMUNICATION CONTROL METHOD

CROSS REFERENCE TO RELATED APPLICATION

This application is a U.S. National Phase of International Appliction No. PCT/JP2009/050997 (filed on Jan. 22, 2009), which claims priority to and the benefit of Japanese Patent Application No. 2008-19538 (filed on Jan. 30, 2008) and Japanese Patent Application No. 2008-19551 (filed on Jan. 30, 2008), the entire contents of which are incorporated herein by reference.

TECHNICAL FIELD

The present invention relates to wireless communication systems, wireless communication apparatus and communication control methods using MIMO communication.

BACKGROUND ART

In recent years, when an independent channel called an eigenmode is used by an SVD (Singular Value Decomposition) scheme in the MIMO (Multiple Input Multiple Output) communication using a plurality of antennas in transmission and reception of data, a communication system has dramatically increased the transmission capacity by controlling transmission power and a modulation scheme of each eigenmode according to an eigenvalue of the eigenmode. However, transmission characteristics are seriously deteriorated in the MIMO communication using the eigenmodes, if orthogonality collapses for some reason.

In order to address such a problem, Patent Document 1 suggests, with a Doppler frequency or the likes as known information, to prevent the characteristic deterioration when the orthogonality collapses, by calculating SINR (Signal to Interference plus Noise Ratio) based on the known information and performing control. Patent Document 1 concerns that a slot to estimate a channel differs from a slot to actually transmit data and that the channel varies due to Doppler variation. As a technique to solve such problems, the document suggests a MIMO eigenmode adaptive transmission system to calculate a value of SINR of the eigenmode based on an estimated value of a channel estimation error due to Doppler variation, an estimated value of loss of gain of an eigenbeam and an estimated value of interference between eigenbeams, and thereby incorporating an adaptive coding modulation function and a simple and highly effective adaptive power control function in consideration of the actual environment having the Doppler variation.
Patent Document 1: Japanese Patent Application Laid-Open No. 2005-252834

DISCLOSURE OF THE INVENTION

Problems to be Solved by the Invention

On the other hand, a scheme to predict the channel variation has been popularly studied. If a channel prediction scheme is provided, loss of gain of the eigenbeam stated above becomes small and thus the MIMO eigenmode adaptive transmission is less influenced. However, an efficiency of such depends on the channel prediction scheme. In addition, even if the channel prediction scheme is provided to a reception side, it is not possible for a transmission side to know how effective the channel prediction scheme of the reception side is, or even whether the reception side has the channel prediction scheme.

Moreover, if the Doppler variation becomes larger, the channel variation in a slot cannot be ignorable regardless of an existence and performance of the channel prediction scheme, and the gain of the eigenbeam is deteriorated in a transmission slot. This is because, if there are a plurality of channel information decomposed by the SVD stated above to the slot, the SVD is burdened with too much calculation load and, since increase in overhead at feedback of a transmission weight or the channel information from the reception side deteriorates the throughput, it is thus preferred for processing that there is only one channel information to be decomposed by the SVD to a slot, basically.

That is, although the characteristic deterioration concerned by a conventional art may be very small depending on existence and performance of the channel prediction scheme, the characteristic deterioration due to the channel variation in the slot is unavoidable as long as there is only one set of transmission weights to the transmission slot.

In addition, if a highly accurate channel variation prediction scheme is provided, the estimated value of loss of gain of the eigenbeam stated above and the estimated value of the interference between eigenbeams become smaller and thus the MIMO eigenmode adaptive transmission is less influenced.

In contrast, if the Doppler variation becomes larger, not only the channel variation between the channel estimation slot and the data transmission slot but also the channel variation within the slot becomes large. If the highly accurate channel variation prediction scheme is sufficiently effective even in such a condition, that is, if the scheme is capable of predicting the channel variation in the data transmission slot and also updating the transmission weight according to the channel predicted in the data transmission slot, the estimated value of loss of gain and the estimated value of the interference between eigenbeams stay small.

However, an eigenvalue of each eigenmode varies within the slot according to the channel variation. FIG. 7 is a graph illustrating a cumulative distribution of eigenvalues, which indicates quality of each eigenmode, when the channel prediction value is appropriate, whereas FIG. 8 is a graph exemplifying variation of the eigenvalue of each eigenmode within the slot. FIG. 7 and FIG. 8 show that a higher eigenmode with large eigenvalues has a smaller variation of the eigenvalue and a lower eigenmode with small eigenvalues has a larger variation of the eigenvalue.

In such a condition, if quality of the eigenmode (SINR) is calculated based on an average of eigenvalues of each eigenmode in the slot and used for the transmission adaptive control, numerous symbols with eigenvalues lower than assumed are generated particularly in the lower eigenmode, leading to deterioration of the transmission characteristics.

It is an object of the present invention to provide wireless communication systems, wireless communication apparatus and communication control methods capable of efficiently executing adaptive control of MIMO and the likes without measuring the Doppler frequency even if a terminal moves at a high speed causing significant channel variations.

SUMMARY OF THE INVENTION

A wireless communication system for performing wireless communication between a transmission apparatus and a reception apparatus via a plurality of eigenmodes according to the present invention includes: a channel estimation unit for calculating a channel estimation value between the transmission apparatus and the reception apparatus; a channel prediction unit for calculating a channel prediction value of the transmission apparatus at transmission based on the channel estimation value calculated by the channel estimation unit; an eigenvalue calculation unit for calculating an eigenvalue in a predetermined period based on the channel prediction value calculated by the channel prediction unit; an eigenmode quality calculation unit for calculating a value indicating quality of the eigenmode in the predetermined period based on the eigenvalue calculated by the eigenvalue calculation unit; and a control unit for controlling predetermined processing of the transmission apparatus at transmission based on the value calculated by the eigenmode quality calculation unit, wherein the control unit controls such that the value indicating the quality is smaller for a higher eigenmode in accordance with frequency of channel variation based on the channel estimation value and/or channel prediction value calculated.

It is preferred that the eigenmode quality calculation unit calculates the value indicating the quality of each eigenmode based on the eigenvalue in the predetermined period and that the control unit calculates the value indicating the quality of each eigenmode based on a value equal to or smaller than the eigenvalue in accordance with the frequency of channel variation. In addition, it is preferred that the control unit controls a decrease value of the eigenvalue in accordance with an order of the eigenmode, and also controls the decrease value of the eigenvalue to be a maximum for a highest eigenmode.

It is preferred that the control unit controls the decrease value of the eigenvalue in accordance with a ratio of the value indicating the quality of each eigenmode. It is also preferred that the control unit controls the decrease value of the eigenvalue in accordance with a difference in the value indicating the quality of each eigenmode.

A wireless communication apparatus for performing wireless communication via a plurality of eigenmodes according to the present invention includes: a channel estimation value obtain unit for obtaining a channel estimation value between the wireless communication apparatus and a counterpart wireless communication apparatus; a channel prediction unit for calculating a channel prediction value at transmission based on the channel estimation value obtained by the channel estimation value obtain unit; an eigenvalue calculation unit for calculating an eigenvalue in a predetermined period based on the channel prediction value calculated by the channel prediction unit; an eigenmode quality calculation unit for calculating a value indicating quality of each eigenmode in the predetermined period based on the eigenvalue calculated by the eigenvalue calculation unit; and a control unit for controlling predetermined processing at transmission based on the value calculated by the eigenmode quality calculation unit, wherein the control unit controls such that the value indicating the quality is smaller for a higher eigenmode in accordance with a frequency of channel variation based on the channel estimation value obtained and/or the channel prediction value calculated.

A communication control method of wireless communication system for performing wireless communication between a transmission apparatus and a reception apparatus via a plurality of eigenmodes according to the present invention includes the steps of: calculating a channel estimation value between the transmission apparatus and the reception apparatus and, based on the channel estimation value calculated, calculating a channel prediction value of the transmission apparatus at transmission; calculating an eigenvalue in a predetermined period based on the channel prediction value; calculating a value indicating quality of each eigenmode in the predetermined period based on the eigenvalue calculated; controlling such that the value indicating the quality is smaller for a higher eigenmode in accordance with frequency of channel variation based on the channel estimation value and/or channel prediction value calculated; and controlling predetermined processing of the transmission apparatus at transmission based on the value indicating the quality of each eigenmode controlled.

A wireless communication system for performing wireless communication between a transmission apparatus and a reception apparatus via a plurality of eigenmodes according to the present invention includes: a channel estimation unit for calculating a channel estimation value between the transmission apparatus and the reception apparatus; a channel prediction unit for calculating a channel prediction value of the transmission apparatus at transmission based on the channel estimation value calculated by the channel estimation unit; an eigenvalue calculation unit for calculating a plurality of eigenvalues in a predetermined period based on the channel prediction value calculated by the channel prediction unit; an eigenmode quality calculation unit for calculating a value indicating quality of the eigenmode in the predetermined period based on the plurality of eigenvalues calculated by the eigenvalue calculation unit; and a control unit for controlling predetermined processing at transmission based on the value calculated by the eigenmode quality calculation unit, wherein the control unit controls such that the value indicating the quality is smaller for a lower eigenmode in accordance with frequency of channel variation based on the channel estimation value and/or channel prediction value calculated.

It is preferred that the eigenmode quality calculation unit calculates the value indicating the quality of each eigenmode based on an average value of the plurality of eigenvalues in the predetermined period and that the control unit calculates the value indicating the quality of each eigenmode based on a value equal to or smaller than the average value in accordance with the frequency of channel variation.

It is preferred that the control unit controls a decrease value of the average value in accordance with an order of the eigenmode and also controls the decrease value of the average value to be a maximum for a lowest eigenmode.

It is preferred that the control unit controls the decrease value of the average value in accordance with a ratio of the value indicating the quality of each eigenmode. It is also preferred to control the decrease value of the average value in accordance with a difference in the value indicating the quality of each eigenmode.

A wireless communication apparatus for performing wireless communication via a plurality of eigenmodes according to the present invention includes: a channel estimation value obtain unit for obtaining a channel estimation value between the wireless communication apparatus and a counterpart wireless communication apparatus; a channel prediction unit for calculating a channel prediction value at transmission based on the channel estimation value obtained by the channel estimation value obtain unit; an eigenvalue calculation unit for calculating a plurality of eigenvalues in a predetermined period based on the channel prediction value calculated by the channel prediction unit; an eigenmode quality calculation unit for calculating a value indicating quality of each eigenmode in the predetermined period based on the plurality of eigenvalues calculated by the eigenvalue calculation unit; and a control unit for controlling predetermined processing at transmission based on the value calculated by the eigenmode quality calculation unit, wherein the control unit controls such that the value indicating the quality is smaller for a lower eigenmode in accordance with frequency of channel variation based on the channel estimation value obtained and/or the channel prediction value calculated.

A communication control method of a wireless communication system for performing wireless communication between a transmission apparatus and a reception apparatus via a plurality of eigenmodes according to the present invention includes the steps of: calculating a channel estimation value between the transmission apparatus and the reception apparatus and, based on the channel estimation value, calculating a channel prediction value of the transmission apparatus at transmission; calculating a plurality of eigenvalues in a predetermined period based on the channel prediction value calculated; calculating a value indicating quality of each eigenmode in the predetermined period based on the plurality of eigenvalues calculated; controlling such that the value indicating the quality is smaller for a lower eigenmode in accordance with frequency of channel variation based on the channel estimation value and/or channel prediction value calculated; and controlling predetermined processing at transmission based on the value indicating the quality of each eigenmode controlled.

EFFECT OF THE INVENTION

According to the present invention, it is possible to efficiently execute adaptive control of MIMO and the likes by considering the frequency of channel variation, even if there is a significant channel variation because of high speed movement of a terminal and the likes. It is thus possible to contribute to improvement of the high speed moving performance.

DESCRIPTION OF EMBODIMENTS

Preferred embodiments of the present invention will be described as follows, with reference to the accompanying drawings.

(First Embodiment)

Figure 1:
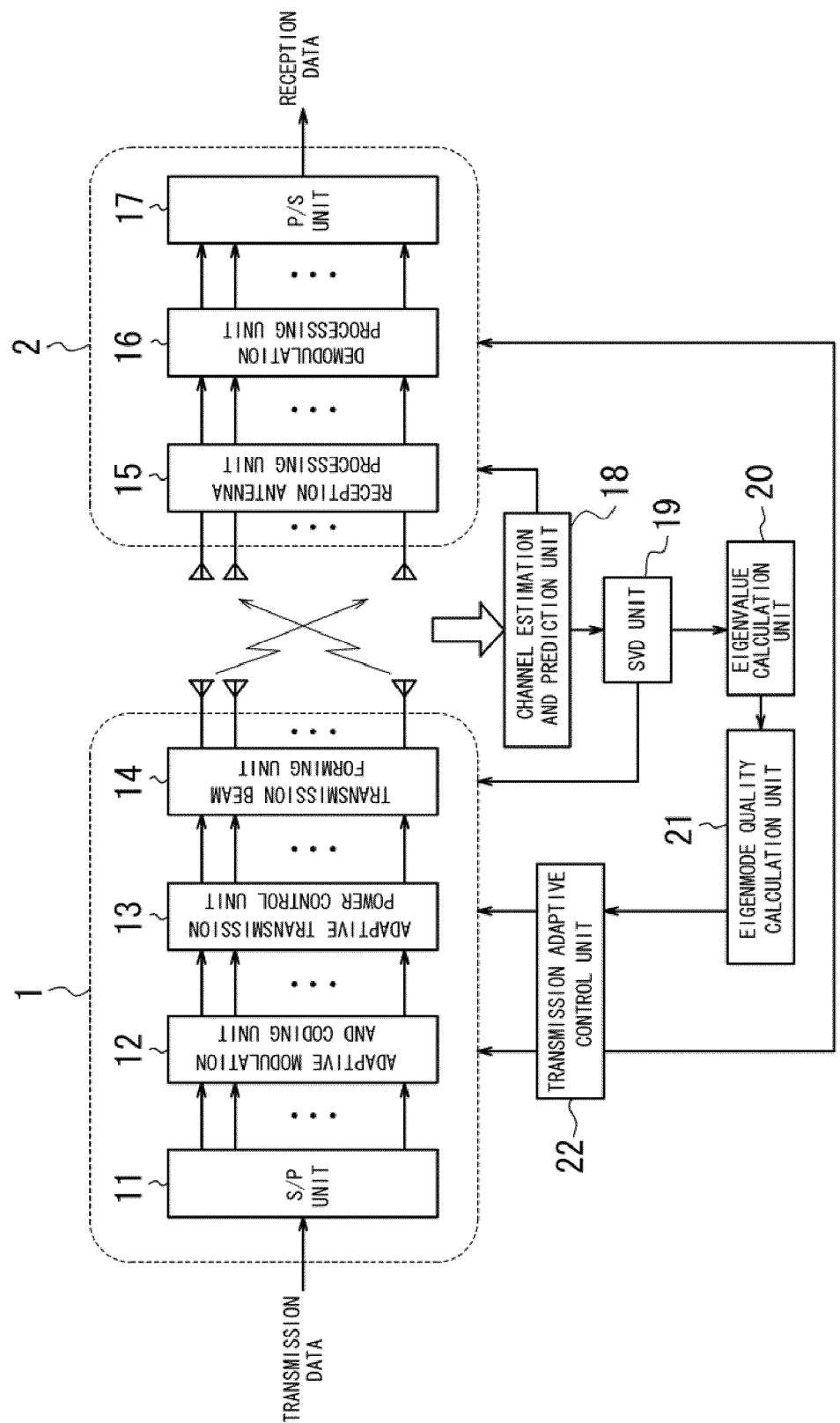
FIG. 1 is a diagram illustrating a basic configuration of a wireless communication system according to a first embodiment of the present invention.

FIG. 1 is a diagram illustrating a basic configuration of a wireless communication system according to a first embodiment of the present invention. As shown in FIG. 1, a transmission apparatus 1 is provided with an S/P unit 11, an adaptive modulation and coding unit 12, an adaptive transmission power control unit 13, and a transmission beam forming unit 14, whereas a reception apparatus 2 is provided with a reception antenna processing unit 15, a demodulation processing unit 16, and a P/S unit 17. A channel estimation and prediction unit 18 (including a channel estimation unit and a channel prediction unit), an SVD unit 19, an eigenvalue calculation unit 20, an eigenmode quality calculation unit 21, and a transmission adaptive control unit 22 may be provided to either the transmission apparatus 1 or the reception apparatus 2.

The S/P unit 11 performs serial-to-parallel conversion on transmission data and outputs transmission data for each eigenmode. The adaptive modulation and coding unit 12 modulates and encodes the transmission data of each eigenmode in accordance with output of the transmission adaptive control unit 22. The adaptive transmission power control unit 13 controls transmission power of a transmission signal of each eigenmode output from the adaptive modulation and coding unit 12, in accordance with the output from the transmission adaptive control unit 22. The transmission beam forming unit 14 forms a transmission eigenbeam by multiplying a transmission signal output from the adaptive transmission power control unit 13 by a transmission weight output from the SVD unit 19 and also multiplexes the signal for each transmission antenna.

A MIMO channel is formed between a plurality of transmission antennas and a plurality of reception antennas. The reception antenna processing unit 15 performs spatial filtering by calculating a reception weight based on a result of channel estimation output from the channel estimation and prediction unit 18, or extracts a signal of each eigenmode by performing a maximum likelihood reception process. The demodulation processing unit 16 performs error-correction demodulation and the likes on the signal of each eigenmode based on output information from the transmission adaptive control unit 22 and outputs reception data. The P/S unit 17 performs parallel-to-serial conversion on the reception data of each eigenmode.

The channel estimation and prediction unit 18 is provided with a channel estimation unit (not shown) for calculating a channel estimation value (for estimating the channel) between the transmission apparatus 1 and the reception apparatus 2, and a channel prediction unit (not shown) for calculating a channel prediction value of the transmission apparatus 1 at transmission based on the channel estimation value calculated by the channel estimation unit. The SVD unit 19 performs singular value decomposition on each channel prediction value calculated by the channel estimation and prediction unit 18. The eigenvalue calculation unit 20 calculates an eigenvalue in a predetermined period (in one slot) based on a singular value of each eigenmode obtained from the SVD unit 19. The eigenmode quality calculation unit 21 calculates a value indicating quality of the eigenmode in the predetermined period based on the eigenvalue calculated by the eigenvalue calculation unit 20 and controls such that the value indicating the quality is smaller for a higher eigenmode in accordance with a frequency of channel variation in the wireless communication. The transmission adaptive control unit 22 controls predetermined processing (transmission power control and/or modulation and coding control) at transmission based on the value calculated by the eigenmode quality calculation unit 21.

Figure 2:
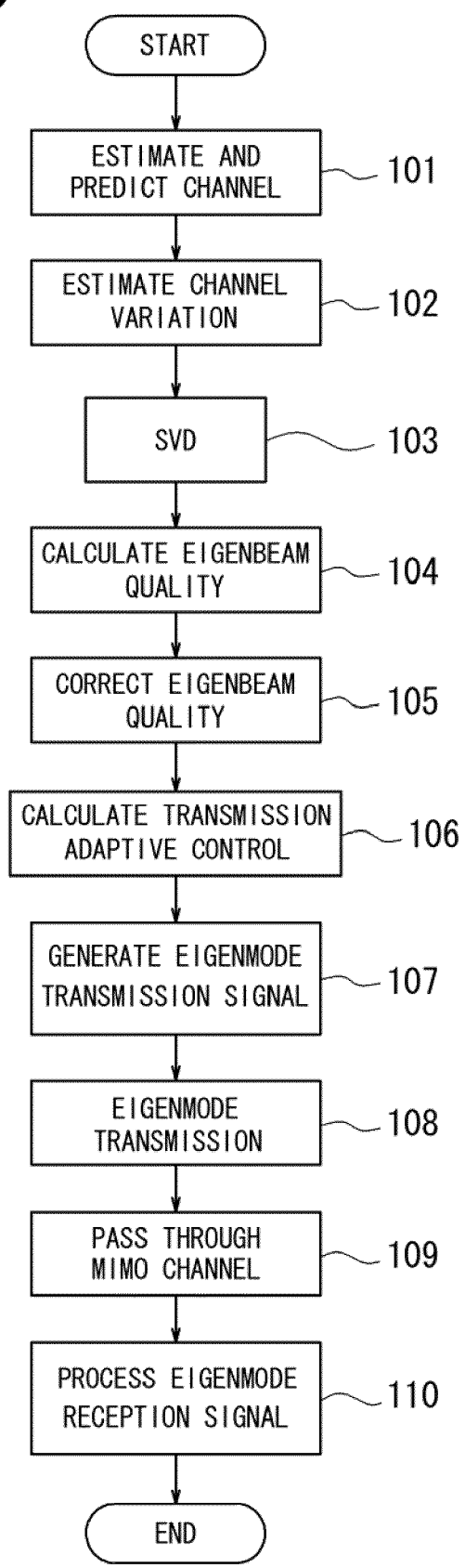
FIG. 2 is a flowchart illustrating an operation of the wireless communication system according to the first embodiment.

FIG. 2 is a flowchart illustrating an operation of the wireless communication system according to the first embodiment of the present invention. This flowchart assumes that the channel varies because of movement of a terminal and the likes.

Figure 3:
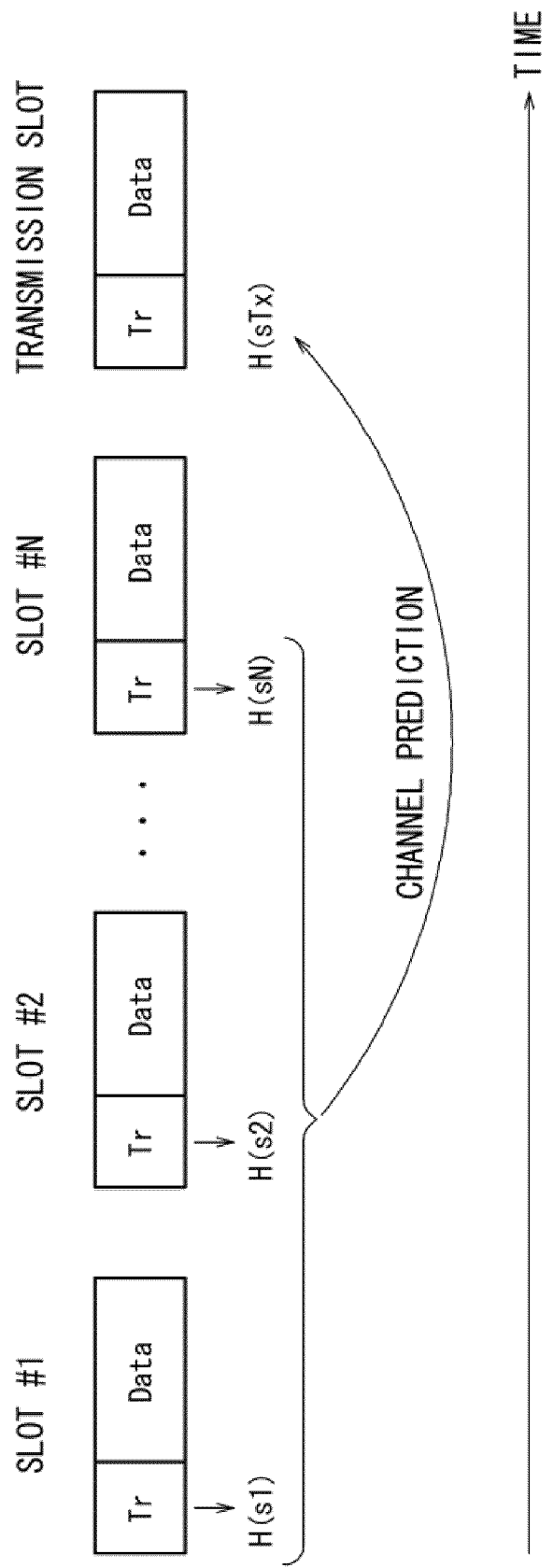
FIG. 3 is a diagram illustrating a state in which a single channel is predicted for a transmission slot based on a plurality of channel estimation values.

First, the channel estimation and prediction unit 18 performs channel estimation and performs channel prediction of a slot to actually transmit data (step 101). The channel estimation and prediction unit 18 may be provided at either a transmission side or a reception side. For FDD (Frequency Division Duplex), for example, the channel estimation and prediction unit 18 is provided at the reception side, whereas, for TDD (Time Division Duplex), the channel estimation and prediction unit 18 is provided at both of the transmission side and the reception side. It is also possible to design estimation and prediction separately at the reception side and at the transmission side. For example, a channel (channel estimation value) estimated at the reception side is fed back to the transmission side, and the transmission side obtains the channel estimation value fed back by a channel estimation value obtain unit (not shown) and, based on the channel estimation value obtained by the channel estimation value obtain unit, predicts the channel of the slot to actually transmit the data. Here, a single channel is predicted for one slot. FIG. 3 is a diagram illustrating a state in which channel estimations are performed from training signals (Tr) of channel estimation slots and a single channel prediction is performed for a transmission slot from a plurality of channel estimation values.

In addition, the channel estimation and prediction unit 18 estimates (calculates) the frequency of channel variation (or a moving speed of the terminal, a Doppler frequency and the likes) in the slot (step 102). In this case, the frequency of channel variation is estimated based on the channel estimation value and/or a channel prediction value calculated by the channel estimation and prediction unit 18. The frequency of channel variation (or the moving speed of the terminal, the Doppler frequency and the likes) may be estimated by the SVD unit 19.

Next, the SVD unit 19 performs singular value decomposition on a channel matrix (step 103).

If the number of transmission antennas is $N_T$ and the number of reception antennas is $N_R$, the channel matrix predicted by the channel estimation and prediction unit 18 is a matrix $N_T \times N_R$ and expressed as:

$$H \quad \text{[Formula 1]}$$

The channel matrix may be processed with singular value decomposition as shown by:

$$H = U\Sigma V^H \quad \text{[Formula 2]}$$

$$\Sigma \quad \text{[Formula 3]}$$

is a diagonal matrix having singular values indicating transfer function of $M=\min[N_T, N_R]$ orthogonal channels (eigenmodes) as elements and expressed as follows:

$$\Sigma = \text{diag}[\sqrt{\lambda_1}, \ldots, \sqrt{\lambda_M}] \quad \text{[Formula 4]}$$

where, it is assumed that $\lambda_m$ is sorted in descending order.

Next, the eigenvalue calculation unit 20 calculates a eigenvalue in a slot based on the singular value of each eigenmode obtained from the SVD unit 19, and the eigenmode quality calculation unit 21 calculates quality (effective SNR (Signal to Noise Ratio)) of each eigenmode (step 104). An SNR to the eigenvalue of eigenmode at m-th is calculated by the following formula:

$$SNR_m = \frac{\lambda_m}{\sigma^2} \quad \text{[Formula 5]}$$

where $\sigma^2$ indicates noise power.

When the Doppler variation is significant, gain of the eigenbeam deteriorates especially in a higher eigenmode because of the channel variation in the slot regardless of existence of a channel prediction scheme.

In order to address such an issue, the transmission adaptive control unit 22 recognizes the frequency of channel variation such as the Doppler frequency based on variations of quality of a lower eigenmode and, according to the frequency of channel variation being increased with respect to a slot length, corrects a value of quality of higher eigenmode to a smaller value (step 105). For example, a corrected SNR of an eigenmode at the m-th is used as the effective SNR (Eff. $SNR_m$).

$$\begin{cases} \text{Eff.}SNR_m = SNR_m, & f_D < \dfrac{\alpha}{T_{slot}} \\ \text{Eff.}SNR_m = \beta_m(f_D) \cdot SNR_m, & f_D \geq \dfrac{\alpha}{T_{slot}} \end{cases} \quad \text{[Formula 6]}$$

where $\beta_m(f_D)$ is a correction factor ($<1$) of the quality of the eigenmode at the m-th to a Doppler frequency $f_D$ recognized by continuously monitoring a value of a lower eigenmode in particular among qualities of the eigenmodes, and is monotone decreasing to $f_D$, with a sharper slope of decrease as the m is smaller. $T_{slot}$ is the slot length.

The transmission adaptive control unit 22 calculates a value indicating quality of each eigenmode based on a value equal to or less than the eigenvalue, in accordance with the frequency of channel variation in the wireless communication. In addition, since the higher eigenmode obtains the more gain of the eigenbeam, loss of gain because of the channel variation is larger and the characteristic is deteriorated because of generation of more low quality symbols than expected in a signal which is processed with transmission adaptive control, the transmission adaptive control unit 22 corrects the value indicating quality of an eigenmode to be smaller as the eigenmode is higher. For the highest eigenmode, the value is corrected so as to have a maximum decrease value.

In addition, since it is expected that the gain of the eigenbeam is larger and loss of gain is also larger as the quality of the eigenmode is higher, the decrease value may be determined by using not only the order of the eigenmode but also a ratio of or a difference in the value indicating the quality of the eigenmode.

Moreover, if a system determines a modulation scheme and a coding scheme from the eigenmode by using a lookup table instead of correcting the quality of the eigenmode, for example, the modulation scheme and the coding scheme selected for the highest eigenmode may lower a level by one if the channel variation is significant.

The present invention regards the frequency of channel variation in a slot, which is smaller than the channel variation between a conventional channel estimation slot and a transmission slot, as an issue. Accordingly, it may be configured so as to start control as described above, instead of a continuous control, when the frequency of channel variation (for example, an unignorable Doppler frequency to the slot length) exceeds a point.

In addition, the transmission adaptive control unit 22 calculates the number of eigenmode to be used, a coded modulation scheme of each eigenmode and transmission power based on the effective SNR after correction (step 106).

Moreover, the adaptive modulation and coding unit 12 modulates and encodes the transmission data of each eigenmode in accordance with a result of calculation by the transmission adaptive control unit 22, and the adaptive transmission power control unit 13 controls the transmission power of the transmission signal of each eigenmode output from the adaptive modulation and coding unit 12 according to the result of calculation by the transmission adaptive control unit 22, so as to generate an eigenmode transmission signal (step 107).

The eigenmode transmission signal generated is multiplied by the transmission weight output from the SVD unit 19 in the transmission beam forming unit 14 so as to be a transmission eigenbeam and then transmitted from a transmission antenna (step 108). The eigenbeam is propagated through the MIMO channel formed between the plurality of transmission antennas and the plurality of reception antennas (step 109).

The reception side processes a reception signal of the eigenmode (step 110). That is, the reception antenna processing unit 15 performs the spatial filtering by calculating the reception weight based on a result of channel estimation output by the channel estimation and prediction unit 18, or performs a maximum likelihood reception process so as to extract the signal of each eigenmode. In addition, the demodulation processing unit 16 performs processes such as error correction decoding on the signal of each eigenmode according to a result of calculation by the transmission adaptive control unit 22.

It is to be noted that the SVD unit is not necessarily required to perform singular value decomposition. For example, the SVD unit may perform a process to find a code number of a weight to maximize the eigenvalue from a predetermined group of weights, called a code book. That is, the SVD unit may perform a process to find a transmission weight and the eigenvalue (singular value) of the eigenmode at that time.

As stated above, the present invention may appropriately perform the transmission adaptive control by considering the frequency of channel variation in the transmission slot even in an environment with significant channel variations because of the Doppler variation and the likes.

(Second Embodiment)

Figure 4:
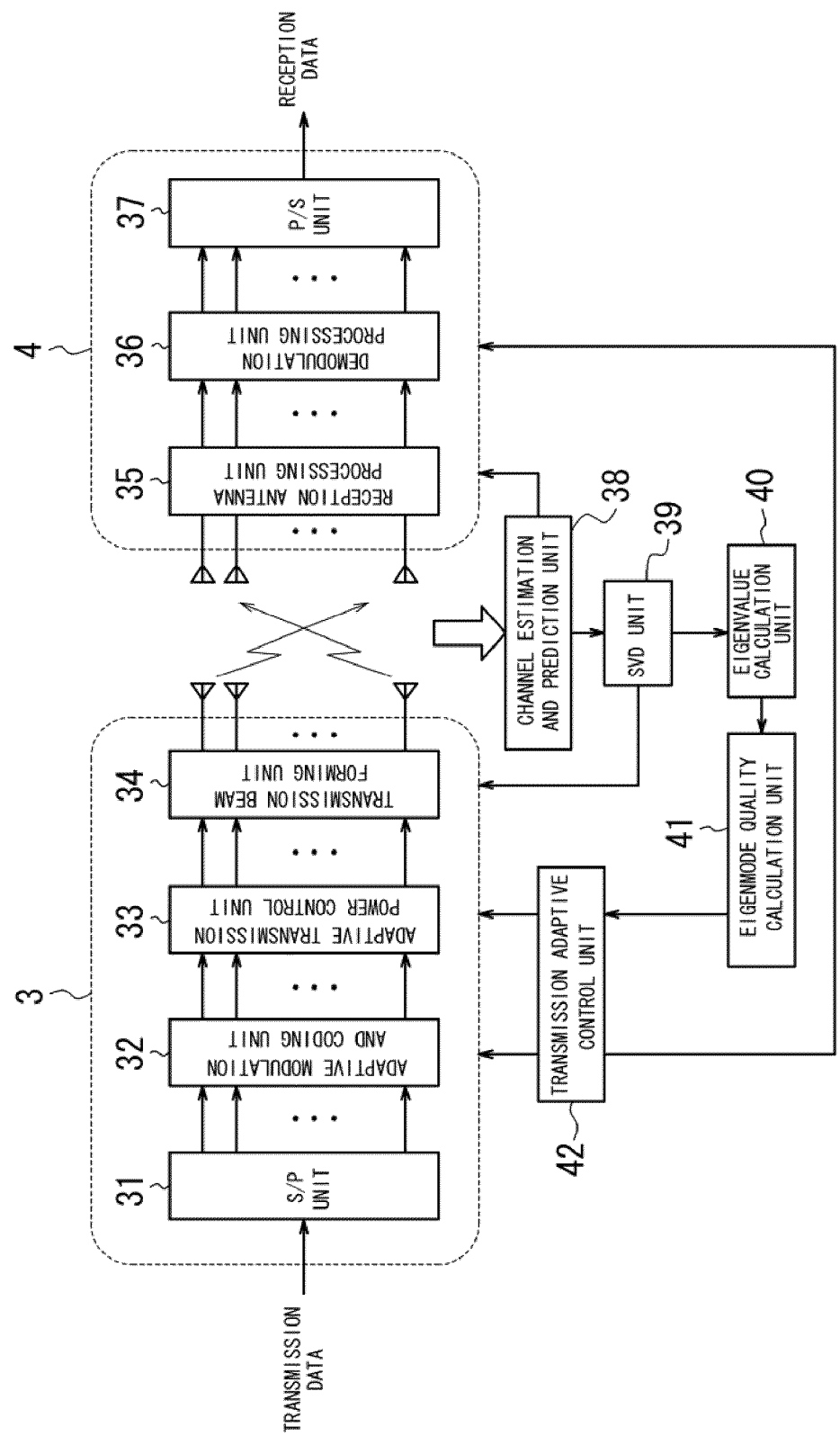
FIG. 4 is a diagram illustrating a basic configuration of a wireless communication system according to a second embodiment of the present invention.

FIG. 4 is a diagram illustrating a basic configuration of a wireless communication system according to a second embodiment of the present invention. As shown in FIG. 4, a transmission apparatus 3 is provided with an S/P unit 31, an adaptive modulation and coding unit 32, an adaptive transmission power control unit 33, and a transmission beam forming unit 34, whereas a reception apparatus 4 is provided with a reception antenna processing unit 35, a demodulation processing unit 36, and a P/S unit 37. A channel estimation and prediction unit 38 (including a channel estimation unit and a channel prediction unit), an SVD unit 39, an eigenvalue calculation unit 40, an eigenmode quality calculation unit 41, and a transmission adaptive control unit 42 may be provided to either the transmission apparatus 3 or the reception apparatus 4.

The S/P unit 31 performs the serial-to-parallel conversion on transmission data and outputs transmission data for each eigenmode. The adaptive modulation and coding unit 32 modulates and encodes the transmission data of each eigenmode in accordance with output of the transmission adaptive control unit 42. The adaptive transmission power control unit 33 controls transmission power of a transmission signal of each eigenmode output from the adaptive modulation and coding unit 32, in accordance with the output from the transmission adaptive control unit 42. The transmission beam forming unit 34 forms a transmission eigenbeam by multiplying a transmission signal output from the adaptive transmission power control unit 33 by a transmission weight output from the SVD unit 39 and also multiplexes the signal of each transmission antenna.

A MIMO channel is formed between a plurality of transmission antennas and a plurality of reception antennas. The reception antenna processing unit 35 performs spatial filtering by calculating a reception weight based on a result of channel estimation output from the channel estimation and prediction unit 38 (channel estimation unit), or extracts the signal of each eigenmode by performing a maximum likelihood reception process. The demodulation processing unit 36 performs processing such as error correction demodulation on the signal of each eigenmode based on output information from the transmission adaptive control unit 42. The P/S unit 37 performs the parallel-to-serial conversion on the reception data of each eigenmode.

The channel estimation and prediction unit 38 is provided with a channel estimation unit (not shown) for calculating a channel estimation value (for estimating the channel) between the transmission apparatus 3 and the reception apparatus 4, and a channel prediction unit (not shown) for calculating a plurality of channel prediction values of the transmission apparatus 3 at transmission based on the channel estimation value calculated by the channel estimation unit. The SVD unit 39 performs singular value decomposition on each of the plurality of channel prediction values calculated by the channel estimation and prediction unit 38. The eigenvalue calculation unit 40 calculates a plurality of eigenvalues in a predetermined period (in one slot) based on a plurality of singular values of each eigenmode obtained from the SVD unit 39. The eigenmode quality calculation unit 41 calculates a value indicating quality of the eigenmode in the predetermined period based on the plurality of eigenvalues calculated by the eigenvalue calculation unit 40 and controls such that the value indicating quality of a eigenmode is smaller as the eigenmode is lower in accordance with a frequency of channel variation in a wireless communication. The transmission adaptive control unit 42 controls predetermined processing (transmission power control and/or modulation and coding control) at transmission based on the value calculated by the eigenmode quality calculation unit 41.

Figure 5:
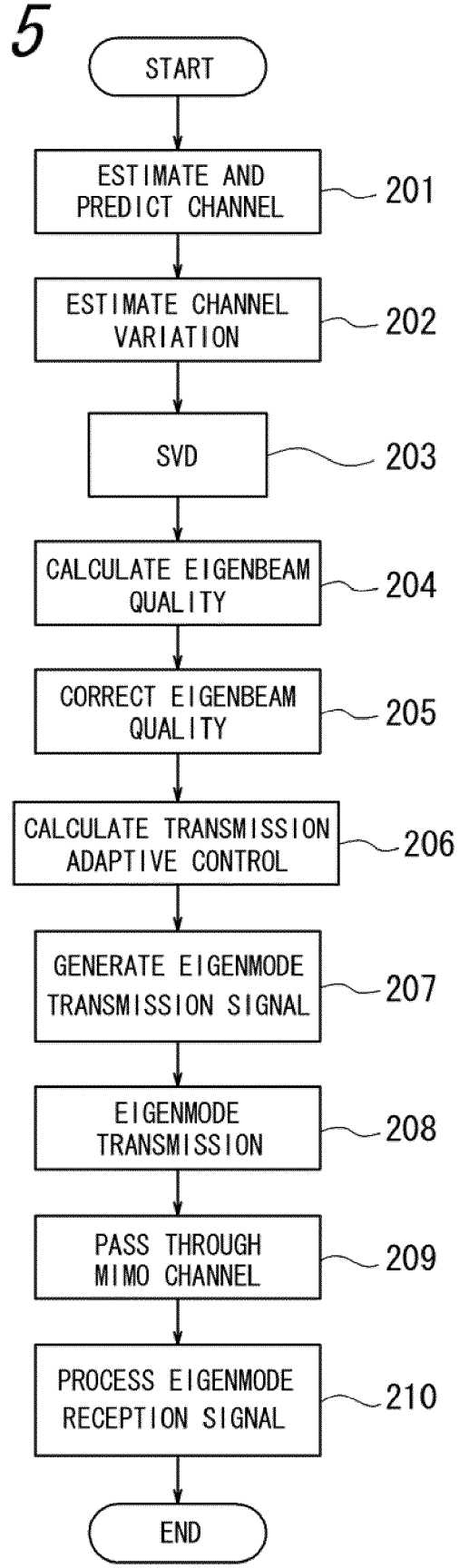
FIG. 5 is a flowchart illustrating an operation of the wireless communication system according to the second embodiment.

FIG. 5 is a flowchart illustrating an operation of the wireless communication system according to the second embodiment of the present invention. This flowchart assumes that a channel varies according to movement of a terminal and the likes.

Figure 6:
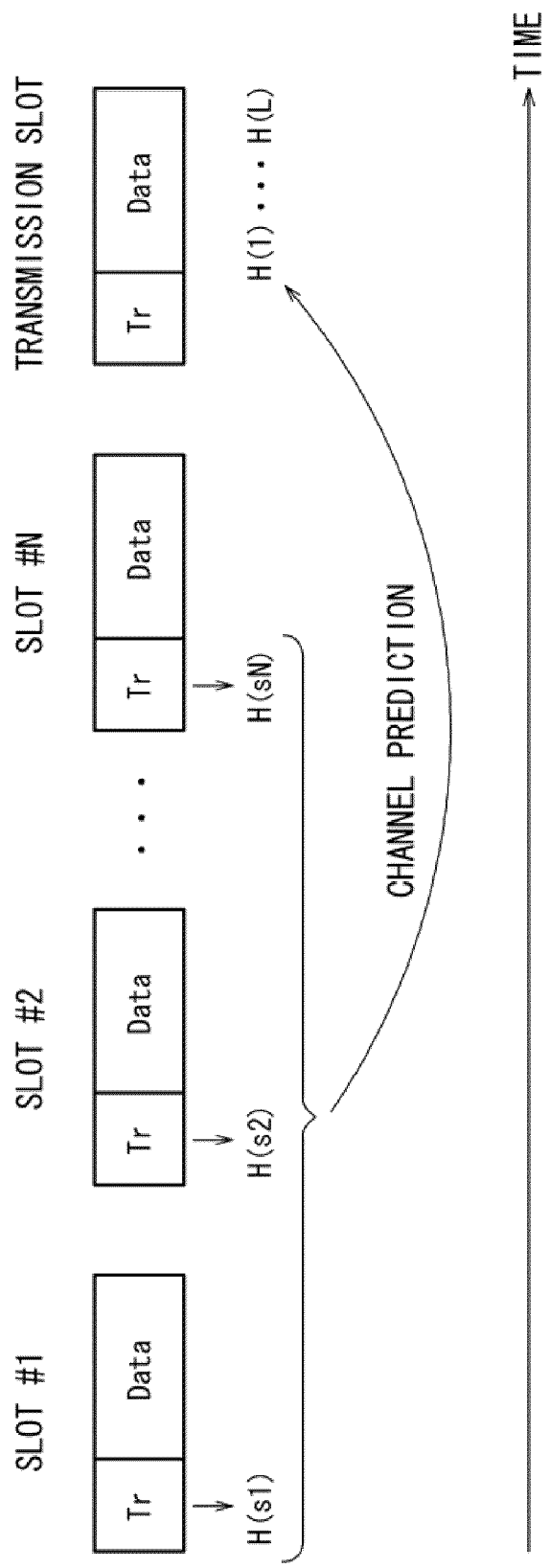
FIG. 6 is a diagram illustrating a state in which a plurality of channels is predicted for a transmission slot based on a plurality of channel estimation values.

First, the channel estimation and prediction unit 38 performs channel estimation, and performs channel prediction of a slot to actually transmit data (step 101). The channel estimation and prediction unit 38 may be provided at either a transmission side or a reception side. For FDD (Frequency Division Duplex), for example, the channel estimation and prediction unit 38 is provided at the reception side, whereas, for TDD (Time Division Duplex), the channel estimation and prediction unit 38 is provided at both of the transmission side and the reception side. It is also possible to design estimation and prediction separately at the reception side and the transmission side. For example, a channel (channel estimation value) estimated at the reception side is fed back to the transmission side, and the transmission side obtains the channel estimation value fed back by a channel estimation value obtain unit (not shown) and, based on the channel estimation value obtained by the channel estimation value obtain unit, predicts the channel of the slot to actually transmit the data. Here, not a single but a plurality of channels is predicted for one slot. FIG. 6 is a diagram illustrating a state in which channel estimations are performed from training signals (Tr) of channel estimation slots and a plurality of channels are predicted for a transmission slot from a plurality of channel estimation values.

In addition, the channel estimation and prediction unit 38 estimates (calculates) the frequency of channel variation (or a moving speed of the terminal, a Doppler frequency and the likes) in the slot (step 102). In this case, the frequency of channel variation is estimated based on the channel estimation value and/or a channel prediction value calculated by the channel estimation and prediction unit 38. The frequency of channel variation (or a moving speed of the terminal, the Doppler frequency and the likes) may be estimated by the SVD unit 39.

Next, the SVD unit 39 performs singular value decomposition on a channel matrix (step 103). Since a plurality of channels is predicted for a single slot by the channel estimation and prediction unit 38, there are a plurality of results for the slot by the SVD.

If the number of transmission antennas is $N_T$ and the number of reception antennas is $N_R$, the channel matrix predicted by the channel estimation and prediction unit 38 is a matrix $N_T \times N_R$ and expressed as:

$$H(l) \quad \text{[Formula 7]}$$

where l is a sample number of a transmission slot, and the number of samples is the number of predicted channels, L. L is the number of symbols of the single slot at maximum. The channel matrix may be processed with singular value decomposition as shown by:

$$H(l)=U(l)\Sigma(l)V^H(l) \quad \text{[Formula 8]}$$

$$\Sigma(l) \quad \text{[Formula 9]}$$

is a diagonal matrix having singular values indicating transfer function of $M=\min[N_T, N_R]$ orthogonal channels (eigenmodes) as elements and shown as follows:

$$\Sigma(l)=\text{diag}[\sqrt{\lambda_1(l)}, \ldots, \sqrt{\lambda_M(l)}] \quad \text{[Formula 10]}$$

where it is assumed that $\lambda_m(l)$ is sorted in descending order.

Next, the eigenvalue calculation unit 40 calculates a plurality of eigenvalues in the slot based on a plurality of singular values of each eigenmode obtained from the SVD unit 39, and the eigenmode quality calculation unit 41 calculates quality (effective SNR (Signal to Noise Ratio)) of each eigenmode (step 104). It is to be noted that there is basically one result of calculation for each eigenmode per slot. This is because, in order to adopt multiple transmission adaptive controls in the slot, it is necessary to inform the reception side of control information but increase of the control information decreases throughput. An SNR is calculated for the eigenvalue of the eigenmode at m-th by the following formula:

$$SNR_m(l) = \frac{\lambda_m(l)}{\sigma^2} \quad \text{[Formula 11]}$$

where $\sigma^2$ indicates noise power.

When an average SNR calculated from L eigenvalues is used as the effective SNR (Eff. $SNR_m$) which indicates the quality of each eigenmode, the effective (Eff. $SNR_m$) is shown as follows:

$$\textit{Eff.SNR}_m = 10\log10\left(\frac{1}{L}\sum_{l=0}^{L-1} \frac{\lambda_m(l)}{\sigma^2}\right) \quad \text{[Formula 12]}$$

Figure 7:
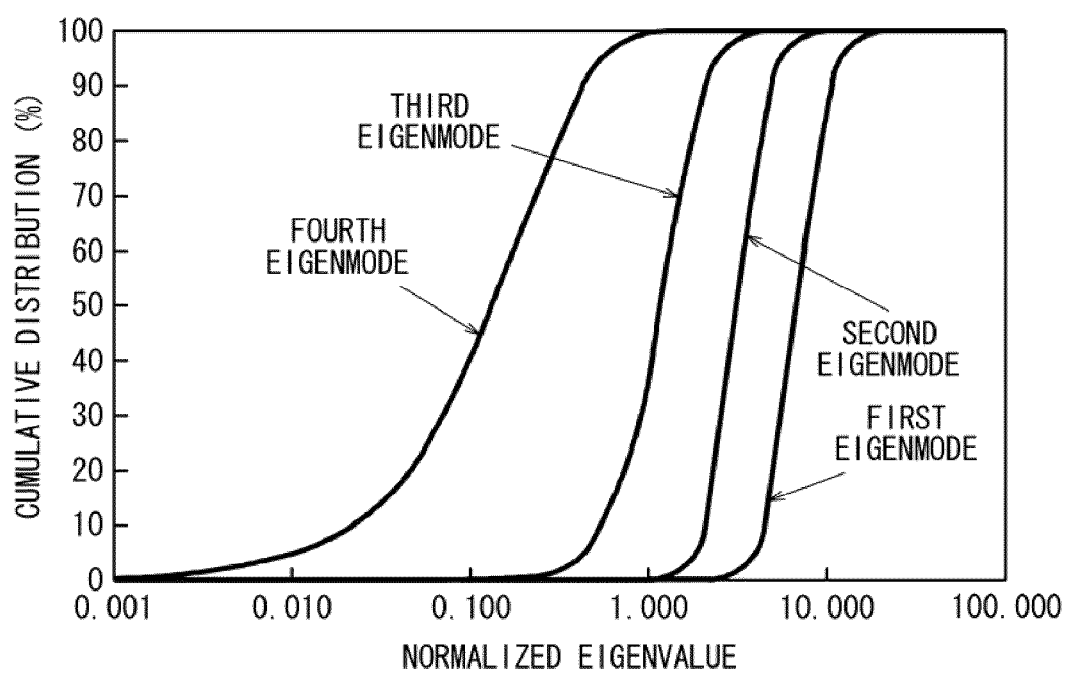
FIG. 7 is a graph illustrating a cumulative distribution of eigenvalues as quality of each eigenmode.
Figure 8:
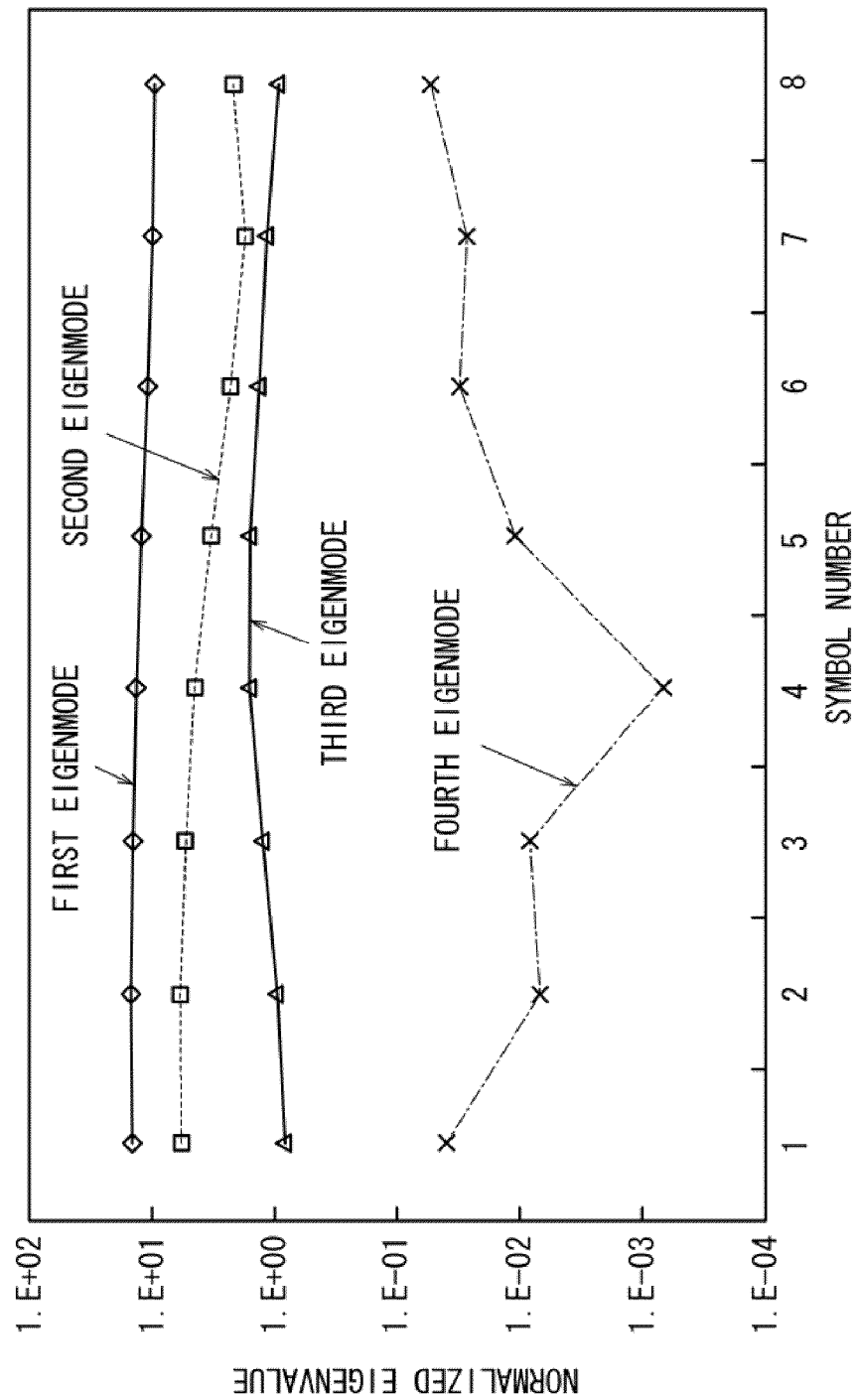
FIG. 8 is a graph exemplifying variation of the eigenvalue of each eigenmode in the slot.

It is not an issue when the Doppler variation is small. When the Doppler variation becomes large, the number of symbols of SNRs lower than the average value is increased. This is more significant as the eigenmode is lower, as shown in FIG. 7 and FIG. 8. If the transmission adaptive control unit 42 does not expect a large variation of the eigenvalue in the slot, it causes characteristic deterioration especially in the lower eigenmode.

In order to address such an issue, the transmission adaptive control unit 42, with respect to the quality of each eigenmode obtained from the eigenmode quality calculation unit 41, corrects quality of the lower eigenmode to a smaller value, in accordance with the frequency of channel variation (or the moving speed of the terminal, the Doppler frequency and the likes) recognized by the channel estimation and prediction unit 38 (or the SVD unit 39) (step 105). For example, the effective SNR of the m-th eigenmode is corrected and used as follows:

$$\textit{Eff.SNR}'_m = \textit{Eff.SNR}_m - \beta_m(f_D) \quad \text{[Formula 13]}$$

where $\beta_m(f_D)$ is a correction factor (>0) of quality of the m-th eigenmode to a Doppler frequency $f_D$ recognized by the channel estimation and prediction unit 38, and is monotone increasing to $f_D$, with a sharper slope of increase as the m is larger.

The transmission adaptive control unit 42 calculates a value indicating quality of each eigenmode based on a value equal to or less than the average value, in accordance with the frequency of channel variation in the wireless communication. In addition, as described above, the transmission adaptive control unit 42 corrects the value indicating quality of an eigenmode to a smaller value as the eigenmode is lower. For the lowest eigenmode, the value is corrected so as to have a maximum decrease value.

In addition, since it is expected that a distribution of eigenvalues is broader as the quality of the eigenmode is lower, the decrease value may be determined by using not only the order of the eigenmode but also a ratio of or a difference in the value indicating the quality of the eigenmode. Since there may be some transmission environment in which there is no much difference between a third eigenmode and a fourth eigenmode as shown in FIG. 7, for example, determination based on only the order of the eigenmode results in a complicated control.

Moreover, if the system determines a modulation scheme and a coding scheme from the eigenmode by using a lookup table instead of correcting the quality of the eigenmode, for example, the modulation scheme and the coding scheme selected for the lowest eigenmode may lower a level by one if the channel variation is significant.

In addition, the transmission adaptive control unit 42 calculates the number of eigenmodes to be used, a coded modulation scheme of each eigenmode and a transmission power based on the effective SNR after correction (step 106).

Next, the adaptive modulation and coding unit 42 modulates and encodes the transmission data of each eigenmode in accordance with a result of calculation by the transmission adaptive control unit 42, and the adaptive transmission power control unit 33 controls the transmission power of the transmission signal of each eigenmode output from the adaptive modulation and coding unit 32 according to the result of calculation by the transmission adaptive control unit 42, so as to generate an eigenmode transmission signal (step 107).

The eigenmode transmission signal generated is multiplied by the transmission weight output from the SVD unit 39 in the transmission beam forming unit 34 so as to be a transmission eigenbeam and transmitted from a transmission antenna (step 108). The eigenbeam is propagated through the MIMO channel formed between the plurality of transmission antennas and the plurality of reception antennas (step 109).

The reception side processes a reception signal of the eigenmode (step 110). That is, the reception antenna processing unit 35 performs the spatial filtering by calculating the reception weight based on a result of channel estimation output by the channel estimate prediction unit 38, or performs a maximum likelihood reception process so as to extract a signal of each eigenmode. In addition, the demodulation processing unit 36 performs processes such as error correction decoding of the signal of each eigenmode according to a result of calculation by the transmission adaptive control unit 42.

It is to be noted that the SVD unit is not necessarily required to perform singular value decomposition. For example, the SVD unit may perform a process to find a code number of a weight to maximize the eigenvalue from a predetermined group of weights, called a code book. That is, the SVD unit may perform a process to find a transmission weight and the eigenvalue (singular value) of the eigenmode at that time.

As described above, according to the present invention, it is possible to appropriately perform the transmission adaptive control by considering the frequency of channel variation even in an environment with a significant channel variation because of the Doppler variation and the likes.

The invention claimed is:

1. A wireless communication system for performing wireless communication between a transmission apparatus and a reception apparatus via a plurality of eigenmodes comprising:
   a channel estimation unit for calculating a channel estimation value between the transmission apparatus and the reception apparatus;
   a channel prediction unit for calculating a channel prediction value of the transmission apparatus at transmission based on the channel estimation value calculated by the channel estimation unit;
   an eigenvalue calculation unit for calculating an eigenvalue in a predetermined period based on the channel prediction value calculated by the channel prediction unit;
   an eigenmode quality calculation unit for calculating a value indicating quality of the eigenmode in the predetermined period based on the eigenvalue calculated by the eigenvalue calculation unit; and
   a control unit for controlling predetermined processing of the transmission apparatus at transmission based on the value calculated by the eigenmode quality calculation unit,
   wherein the control unit controls such that the value indicating the quality is smaller for a higher eigenmode in accordance with frequency of channel variation based on the channel estimation value and/or channel prediction value calculated.

2. The wireless communication system according to claim 1, wherein the eigenmode quality calculation unit calculates the value indicating the quality of each of the eigenmodes based on the eigenvalue in the predetermined period, and
   the control unit calculates the value indicating the quality of each of the eigenmodes based on a value equal to or smaller than the eigenvalue in accordance with the frequency of channel variation.

3. The wireless communication system according to claim 2, wherein the control unit controls a decrease value of the eigenvalue in accordance with an order of the eigenmode.

4. The wireless communication system according to claim 3, wherein the control unit controls the decrease value of the eigenvalue to be a maximum for a highest eigenmode.

5. The wireless communication system according to claim 2, wherein the control unit controls the decrease value of the eigenvalue in accordance with a ratio of the value indicating the quality of each of the eigenmodes.

6. The wireless communication system according to claim 2, wherein the control unit controls the decrease value of the eigenvalue in accordance with a difference in the value indicating the quality of each of the eigenmodes.

7. A wireless communication apparatus for performing wireless communication via a plurality of eigenmodes comprising:
   a channel estimation value obtain unit for obtaining a channel estimation value between the wireless communication apparatus and a counterpart wireless communication apparatus;
   a channel prediction unit for calculating a channel prediction value at transmission based on the channel estimation value obtained by the channel estimation value obtain unit;
   an eigenvalue calculation unit for calculating an eigenvalue in a predetermined period based on the channel prediction value calculated by the channel prediction unit;
   a channel prediction unit for calculating a channel prediction value at transmission based on channel estimation of the counterpart wireless communication apparatus in a direction of reception;
   an eigenvalue calculation unit for calculating an eigenvalue in a predetermined period based on the channel prediction value calculated by the channel prediction unit;
   an eigenmode quality calculation unit for calculating a value indicating quality of each of the eigenmodes in the predetermined period based on the eigenvalue calculated by the eigenvalue calculation unit; and
   a control unit for controlling predetermined processing at transmission based on the value calculated by the eigenmode quality calculation unit,
   wherein the control unit controls such that the value indicating the quality is smaller for a higher eigenmode in accordance with frequency of channel variation based on the channel estimation value obtained and/or the channel prediction value calculated.

8. A communication control method of a wireless communication system for performing wireless communication between a transmission apparatus and a reception apparatus via a plurality of eigenmodes comprising the steps of:
   calculating a channel estimation value between the transmission apparatus and the reception apparatus and, based on the channel estimation value calculated, calculating a channel prediction value of the transmission apparatus at transmission;
   calculating an eigenvalue in a predetermined period based on the channel prediction value calculated;
   calculating a value indicating quality of each of the eigenmodes in the predetermined period based on the eigenvalue calculated;
   controlling such that the value indicating the quality is smaller for a higher eigenmode in accordance with frequency of channel variation based on the channel estimation value and/or channel prediction value calculated; and controlling predetermined processing of the transmission apparatus at transmission based on the value indicating the quality of each of the eigenmodes controlled.

9. A wireless communication system for performing wireless communication between a transmission apparatus and a reception apparatus via a plurality of eigenmodes comprising:
- a channel estimation unit for calculating a channel estimation value between the transmission apparatus and the reception apparatus;
- a channel prediction unit for calculating a channel prediction value of the transmission apparatus at transmission based on the channel estimation value calculated by the channel estimation unit;
- an eigenvalue calculation unit for calculating a plurality of eigenvalues in a predetermined period based on the channel prediction value calculated by the channel prediction unit;
- an eigenmode quality calculation unit for calculating a value indicating quality of the eigenmode in the predetermined period based on the plurality of eigenvalues calculated by the eigenvalue calculation unit; and
- a control unit for controlling predetermined processing at transmission based on the value calculated by the eigenmode quality calculation unit,
- wherein the control unit controls such that the value indicating the quality is smaller for a lower eigenmode in accordance with frequency of channel variation based on the channel estimation value and/or channel prediction value calculated.

10. The wireless communication system according to claim 9, wherein the eigenmode quality calculation unit calculates the value indicating the quality of each of the eigenmodes based on an average value of the plurality of eigenvalues in the predetermined period and,
the control unit calculates the value indicating the quality of each of the eigenmodes based on a value equal to or smaller than the average value in accordance with the frequency of channel variation.

11. The wireless communication system according to claim 10, wherein the control unit controls a decrease value of the average value in accordance with an order of the eigenmode.

12. The wireless communication system according to claim 11, wherein the control unit controls the decrease value of the average value to be a maximum for a lowest eigenmode.

13. The wireless communication system according to claim 10, wherein the control unit controls the decrease value of the average value in accordance with a ratio of the value indicating the quality of each of the eigenmodes.

14. The wireless communication system according to claim 10, wherein the control unit controls the decrease value of the average value in accordance with a difference in the value indicating the quality of each of the eigenmodes.

15. A wireless communication apparatus for performing wireless communication via a plurality of eigenmodes comprising:
- a channel estimation value obtain unit for obtaining a channel estimation value between the wireless communication apparatus and a counterpart wireless communication apparatus;
- a channel prediction unit for calculating a channel prediction value at transmission based on the channel estimation value obtained by the channel estimation value obtain unit;
- an eigenvalue calculation unit for calculating a plurality of eigenvalues in a predetermined period based on the channel prediction value calculated by the channel prediction unit;
- an eigenmode quality calculation unit for calculating a value indicating quality of each of the eigenmodes in the predetermined period based on the plurality of eigenvalues calculated by the eigenvalue calculation unit; and
- a control unit for controlling predetermined processing at transmission based on the value calculated by the eigenmode quality calculation unit,
- wherein the control unit controls such that the value indicating the quality is smaller for a lower eigenmode in accordance with frequency of channel variation based on the channel estimation value obtained and/or the channel prediction value calculated.

16. A communication control method of a wireless communication system for performing wireless communication between a transmission apparatus and a reception apparatus via a plurality of eigenmodes comprising the steps of:
- calculating a channel estimation value between the transmission apparatus and the reception apparatus and, based on the channel estimation value calculated, calculating a channel prediction value of the transmission apparatus at transmission;
- calculating a plurality of eigenvalues in a predetermined period based on the channel prediction value calculated;
- calculating a value indicating quality of the eigenmodes in the predetermined period based on the plurality of eigenvalues calculated;
- controlling such that the value indicating the quality is smaller for a lower eigenmode in accordance with frequency of channel variation based on the channel estimation value and/or channel prediction value calculated; and
- controlling predetermined processing at transmission based on the value indicating the quality of each of the eigenmodes controlled.

* * * * *